Feb. 28, 1961   L. E. BOND   2,972,821
KINESTHETIC VISUAL TEACHING AID
Filed Feb. 25, 1957
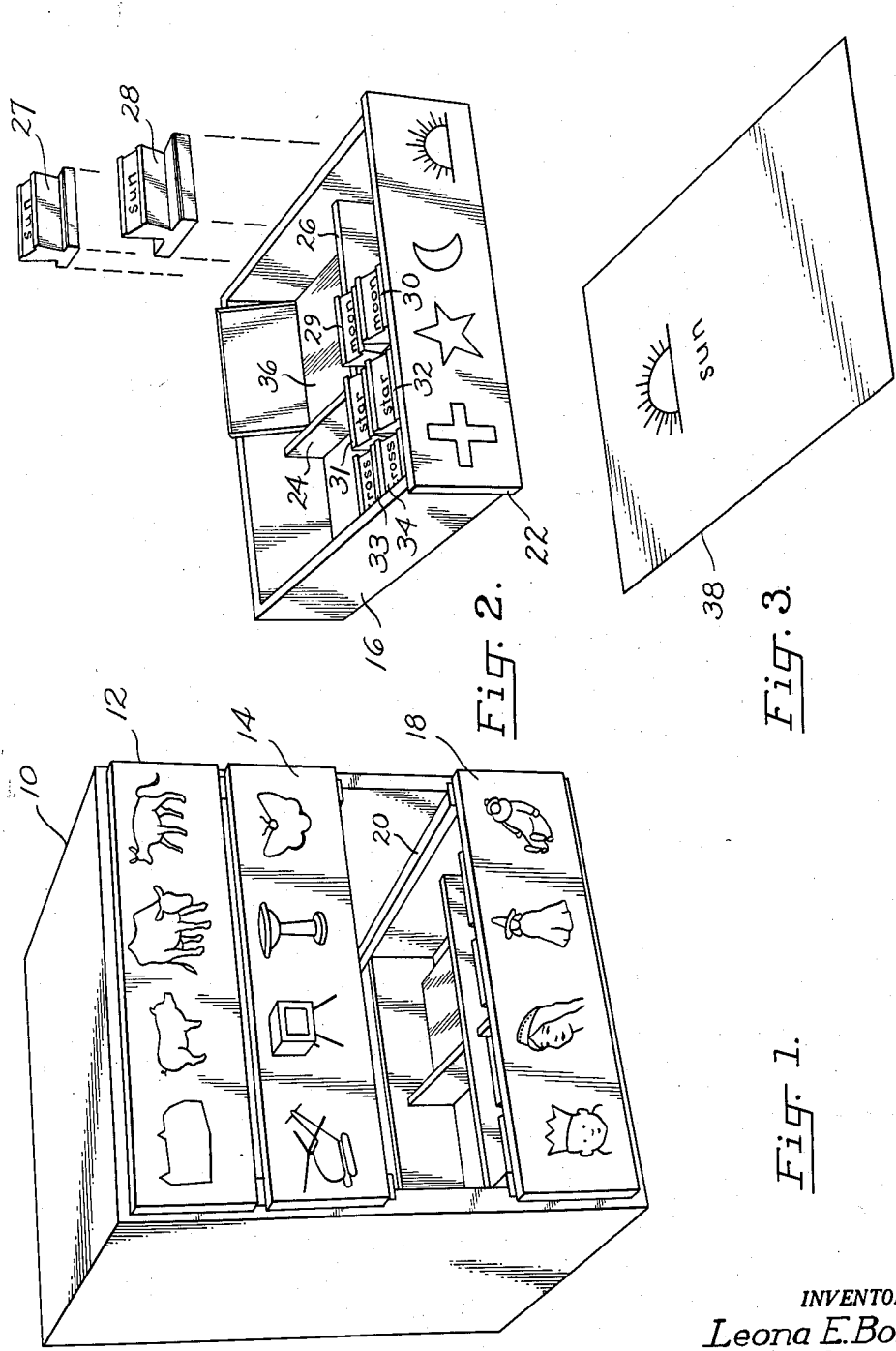
INVENTOR.
Leona E. Bond
BY
Atty.

United States Patent Office 2,972,821
Patented Feb. 28, 1961

2,972,821

KINESTHETIC VISUAL TEACHING AID

Leona E. Bond, 514 S. 3rd St., Kelso, Wash.

Filed Feb. 25, 1957, Ser. No. 642,274

3 Claims. (Cl. 35—60)

This invention relates to a kit for teaching reading, particularly to small children.

It is the general purpose of the present invention to provide a kit for teaching reading which has the following objects and advantages:

(1) It effectively teaches reading to small children as well as to retarded older children, children with impaired vision, and children with impaired speech.

(2) It establishes the left to right eye movement employed in reading.

(3) It provides children with matching experiences.

(4) It helps children focus their eyes on near objects and symbols.

(5) It helps children realize that symbols have meaning.

(6) It builds sight vocabulary.

(7) It provides experiences with numbers.

(8) It promotes growth in eye and hand coordination.

The invention is described herein with particular reference to the drawings, in which:

Fig. 1 is a perspective view of the teaching reading kit of my invention with one of the drawers removed;

Fig. 2 is a perspective view of a drawer or receptacle for use in the kit of Fig. 1; and Fig. 3 is a perspective view of a sheet of paper illustrating the application of the kit of Figs. 1 and 2.

Broadly stated, the presently described kit for teaching reading comprises in combination a receptacle having a face panel marked with the picture of an article, and within the receptacle a pair of rubber stamps aligned with the picture on the face panel, one bearing the same picture and the other the name of the article.

Accordingly, the child learning to read first selects a picture on the face panel. Next he selects the rubber stamp bearing the same picture and imprints it on a piece of paper. Finally, he selects the rubber stamp bearing the article name and imprints it on the paper below the picture, thereby learning to associate the picture with the word.

Considering the foregoing in greater detail and with particular reference to the drawings:

The reading kit of my invention preferably is provided in multiple units housed in a cabinet 10. This cabinet suitably dimensioned for the reception of one or more drawers 12, 14, 16, 18 mounted on spaced pairs of parallel slides 20.

Each drawer is provided with a face panel upon which appear one or more pictures illustrating articles, the names of which are to be taught. Thus drawer 16 is provided with face panel 22 upon which are depicted, side by side, a cross, a star, the moon and the sun. Pictures of any desired articles may thus be portrayed, other illustrative ones being shown on the face panels of drawers 12, 14 and 18.

Drawer 16 serves as a receptacle for containing the other components of the kit and accordingly may be divided into compartments by partitions 24, 26. The forward compartment directly behind face panel 22 is designed to accommodate a plurality of pairs of rubber stamps 27 and 28, 29 and 30, 31 and 32, and 33 and 34. These are large enough to be grasped conveniently by the child and preferably are of substantially uniform size. One member of each pair bears one of the pictures appearing on the face panel and the other member of the pair bears the name of the article illustrated by the picture. For example, stamp 28 bears the same picture of the sun which appears on the face panel, and stamp 27 bears the word "sun." The "sun" labels on both stamps are identical in letter size and style to make possible practice of identical matching teaching techniques.

When placed in the forward compartment, each pair of stamps is aligned with the corresponding picture on the face panel, the stamp bearing the picture being immediately adjacent the face panel. Accordingly, in use, the child first inspects the face panel of the drawer, and selects the picture which interests him, e.g. the picture of the sun on face panel 22 of drawer 16. He then removes the adjacent stamp 28, inks it on an ink pad 36 which conveniently may be situated in one of the rear compartments of the drawer, and applies it to a piece of paper 38, a sheaf or pad of which conveniently may be stored with crayons and other materials in the other back compartment of the drawer. He then replaces stamp 28, inks stamp 27 and applies it beneath the picture which he has stamped on the paper. This supplies the name of the object which he has illustrated on the picture and teaches him to associate the word with the object, thereby teaching him to read.

The reading kit of my invention may be used as a tool for conducting drills of various sorts, all of which teach the child to read and assist in developing various skills. Thus it may be used to teach the child to recognize various objects, to associate the objects with their names, to identify the objects on any given drawer panel from left to right for developing left to right reading habits, to count the pictures appearing on the face panel, to color, cut and paste the stamped pictures etc. As a result, even very young children and retarded or handicapped children may be taught reading and related skills with particular effectiveness.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A kit for teaching reading comprising in combination a receptacle having a face panel exteriorly marked with a plurality of pictures of objects, rearwardly extending, compartment means within the receptacle, and a plurality of pairs of rubber stamps in the compartment means, each pair of the stamps being aligned rearwardly with a picture on the face panel, a pair thus aligned comprising a first stamp bearing the same picture as that on the face panel with which it is aligned, and a second stamp bearing the name of the object portrayed in the picture.

2. A kit for teaching reading comprising in combination a cabinet, a drawer slidably mounted in the cabinet, the drawer having a face panel marked with a plurality of pictures of objects arranged side by side, rearwardly extending compartment means within the drawer, and a plurality of pairs of rubber stamps for insertion in the compartment means, each pair of rubber stamps being aligned rearwardly with one of the pictures on the face panel, the pair thus aligned comprising a first rubber stamp bearing the same picture as that on the face panel with which it is aligned, and a second rubber stamp bearing the name of the object portrayed in the said picture.

3. The kit of claim 2 wherein the first rubber stamp is immediately adjacent the face panel.

References Cited in the file of this patent

UNITED STATES PATENTS

| | | |
|---|---|---|
| 209,307 | Trickey | Oct. 22, 1878 |
| 364,845 | Oakley | June 14, 1887 |
| 1,269,384 | Campbell | June 11, 1918 |
| 1,353,703 | Babcock | Sept. 21, 1920 |
| 1,607,660 | Zabriskie | Nov. 23, 1926 |
| 1,755,853 | Waring | Apr. 22, 1930 |
| 2,756,515 | Hoffman | July 31, 1956 |

FOREIGN PATENTS

| | | |
|---|---|---|
| 680,173 | Great Britain | Oct. 1, 1952 |